United States Patent [19]
Mill

[11] Patent Number: 6,082,066
[45] Date of Patent: Jul. 4, 2000

[54] MODULAR BUILDING SYSTEM

[75] Inventor: Peter A. D. Mill, Dartmouth, Canada

[73] Assignee: Peter Mill, Dartmouth, Canada

[21] Appl. No.: 08/981,481

[22] PCT Filed: Apr. 28, 1997

[86] PCT No.: PCT/CA97/00285

§ 371 Date: Jun. 10, 1998

§ 102(e) Date: Jun. 10, 1998

[87] PCT Pub. No.: WO97/41318

PCT Pub. Date: Nov. 6, 1997

[30] Foreign Application Priority Data

Apr. 26, 1996 [GB] United Kingdom .................. 9608731
Sep. 5, 1996 [GB] United Kingdom .................. 9618519

[51] Int. Cl.[7] ............................................. E04B 1/02
[52] U.S. Cl. .................... 52/262; 52/223.6; 52/309.5; 52/481.1; 52/712; 52/731.5; 52/745.1; 403/232.1
[58] Field of Search .................. 52/223.6, 223.8, 52/223.11, 262, 267, 268, 269, 293.3, 309.5, 309.7, 309.11, 481.1, 281, 712, 579, 731.5, 745.05, 745.1, 745.21; 403/232.1

[56] References Cited

U.S. PATENT DOCUMENTS

| | | | |
|---|---|---|---|
| 2,064,789 | 12/1936 | Faber | 52/602 |
| 4,192,108 | 3/1980 | Lowe | 52/90 |
| 4,274,242 | 6/1981 | Linton et al. | 52/309.11 X |
| 4,296,798 | 10/1981 | Schramm | 165/56 |
| 4,418,507 | 12/1983 | Roberts et al. | 52/309.11 X |
| 4,506,482 | 3/1985 | Pracht et al. | 52/235 |
| 4,641,468 | 2/1987 | Slater | 52/309.9 X |
| 4,896,985 | 1/1990 | Commins | 52/712 X |
| 5,218,804 | 6/1993 | Campbell | 52/262 |
| 5,279,089 | 1/1994 | Gulur | 52/309.9 X |
| 5,280,689 | 1/1994 | Mill | 52/309.9 |
| 5,640,817 | 6/1997 | Bos | 52/270 |
| 5,746,034 | 5/1998 | Luchetti et al. | 52/239 X |

FOREIGN PATENT DOCUMENTS

| | | | |
|---|---|---|---|
| 952299 | 4/1956 | Germany . | |
| 6-73806 | 3/1994 | Japan | 52/783.1 |

*Primary Examiner*—Carl D. Friedman
*Assistant Examiner*—Winnie S. Yip
*Attorney, Agent, or Firm*—Marks & Clerk

[57] ABSTRACT

An integrated construction panel is designed for use in the construction of modular buildings. The panel comprises a grid of structural studs made of fire-proof material bonded together by an adhesive with a high degree of elasticity. A rigid frame surrounds the grid and is attached to the end of the studs. The frame is adapted to mate with an adjacent similar panel. Front and rear wall members are attached to the frame to define a substantially enclosed space therewithin. A closed cell foam substantially fills the space to provide additional adhesion and distribute external loads throughout the panel.

18 Claims, 6 Drawing Sheets

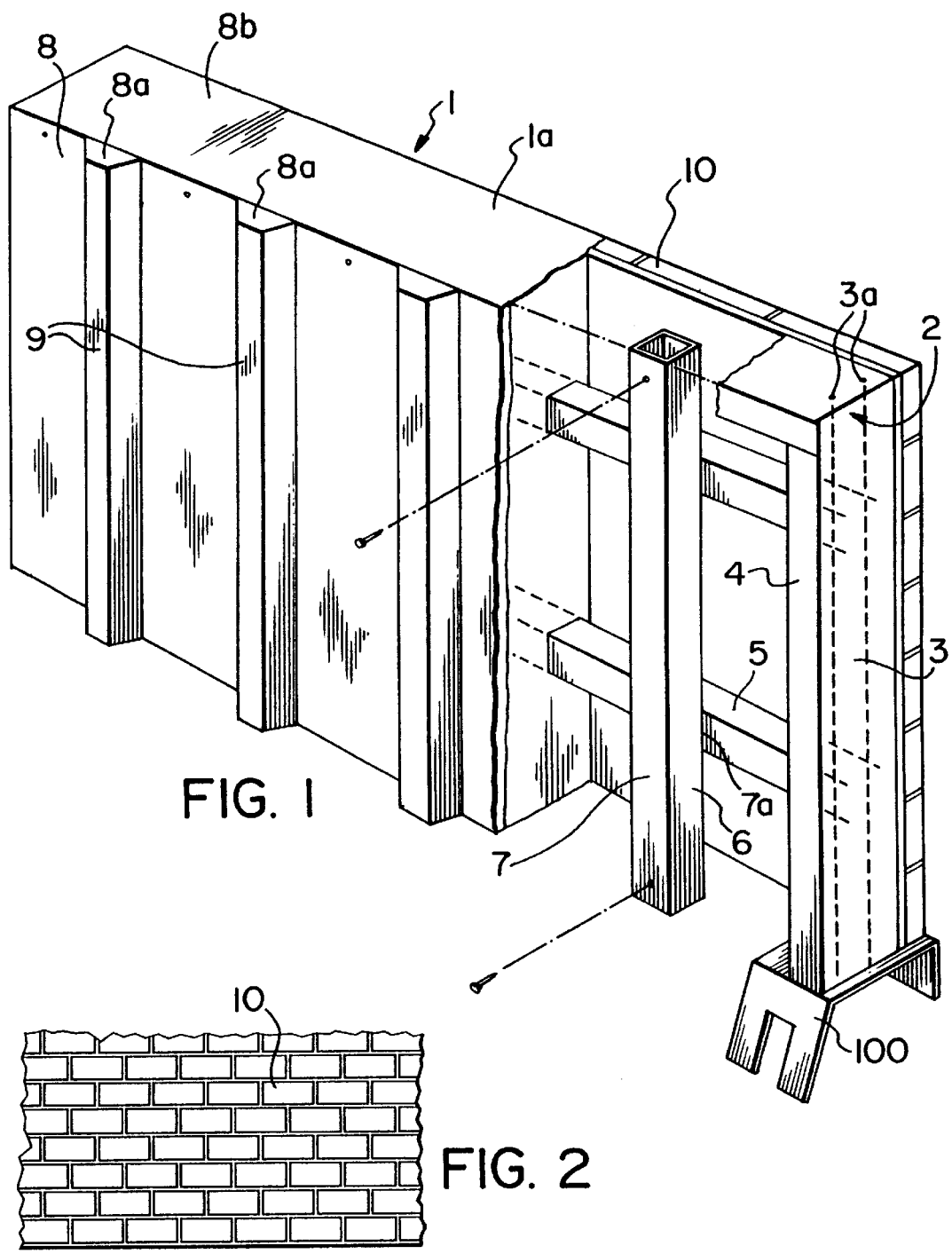

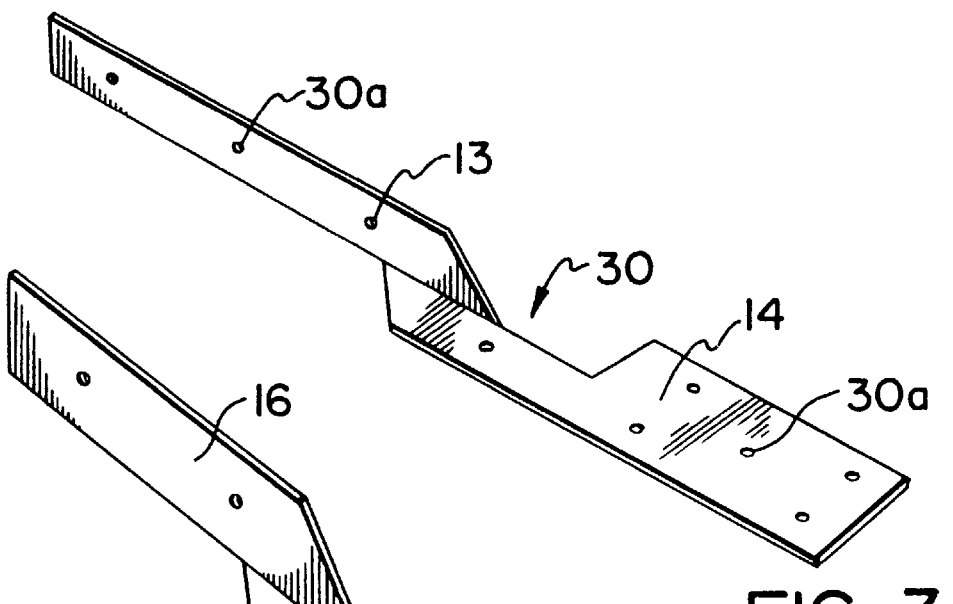
FIG. 3
FIG. 4
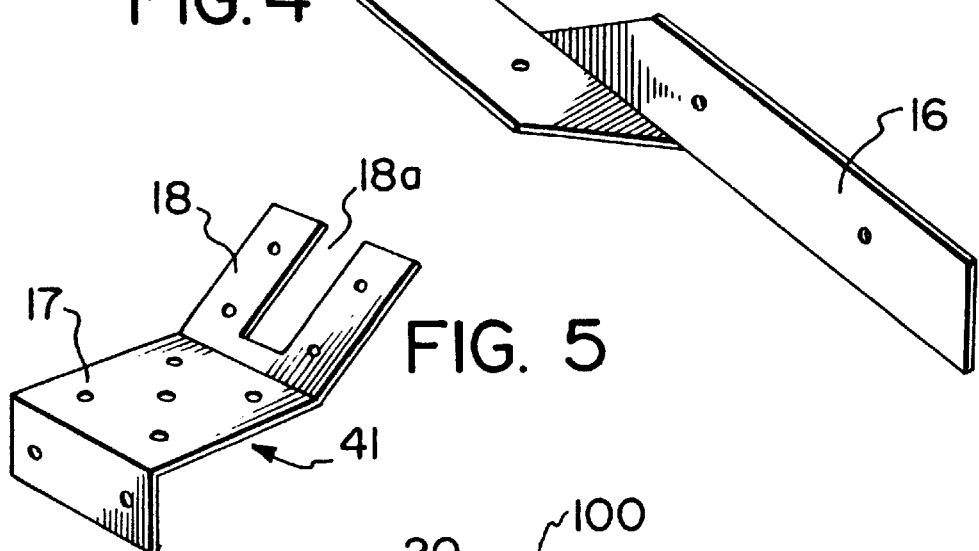
FIG. 5
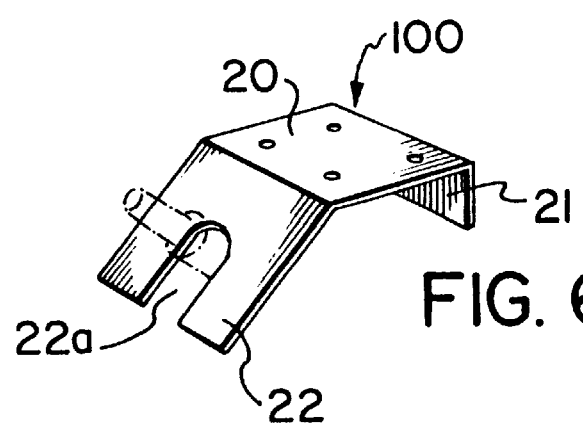
FIG. 6

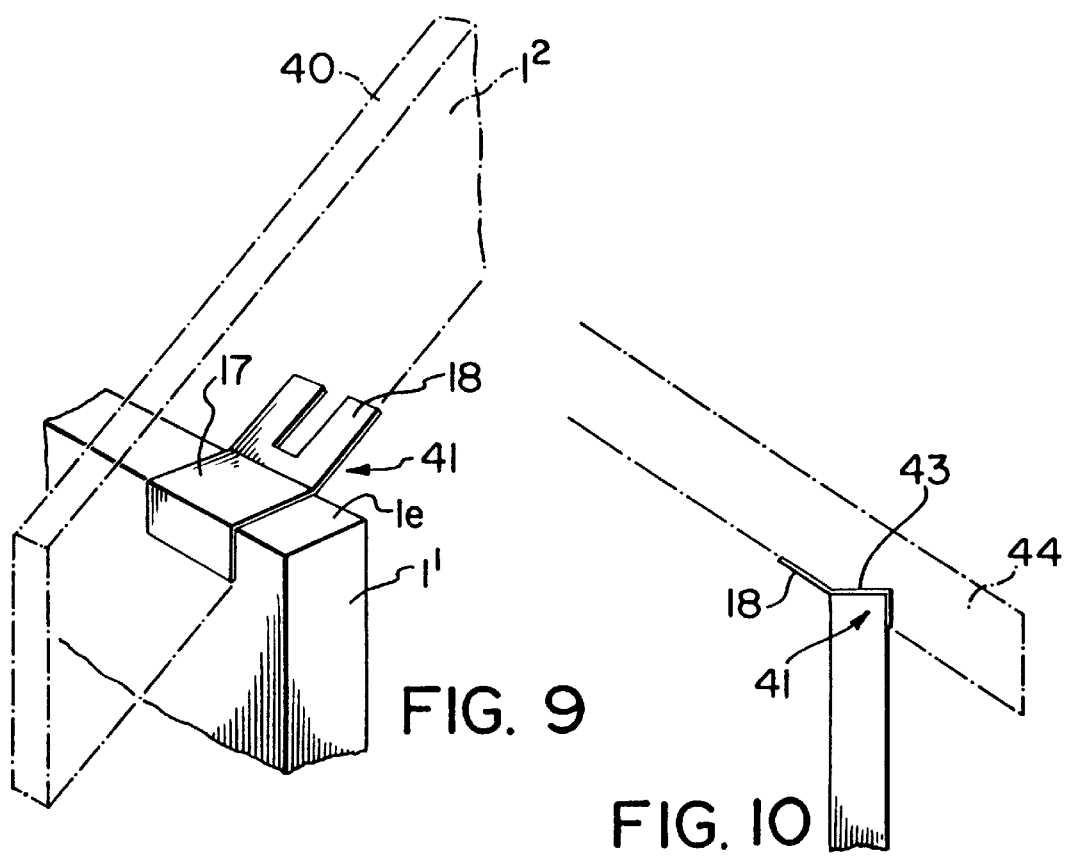
FIG. 9
FIG. 10
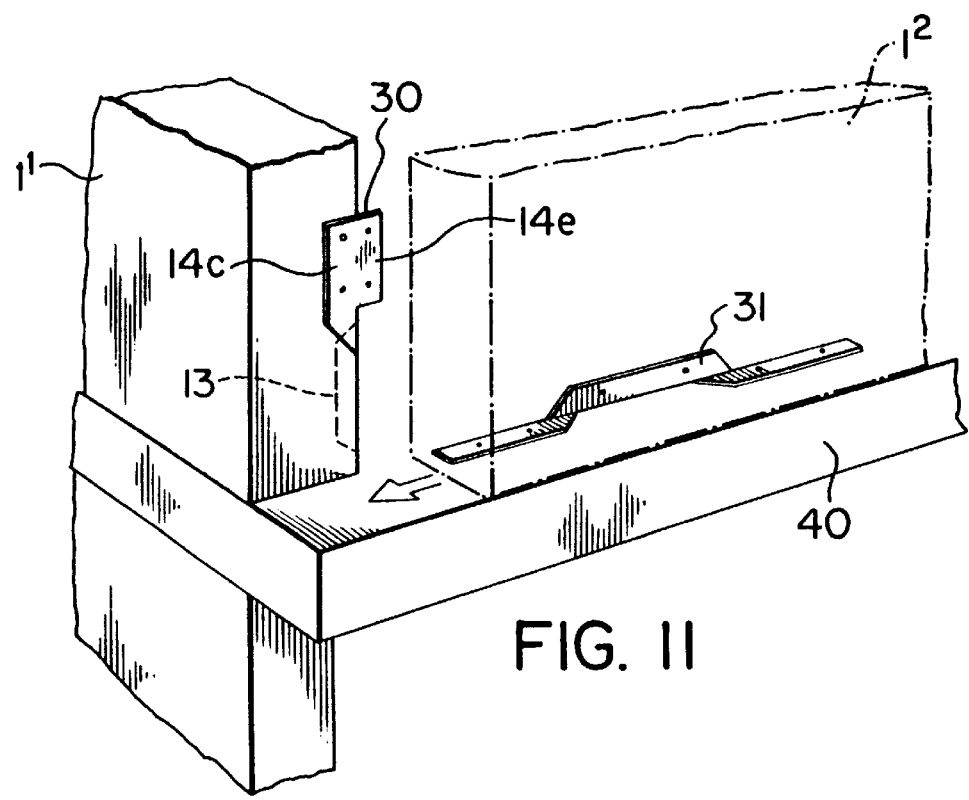
FIG. 11

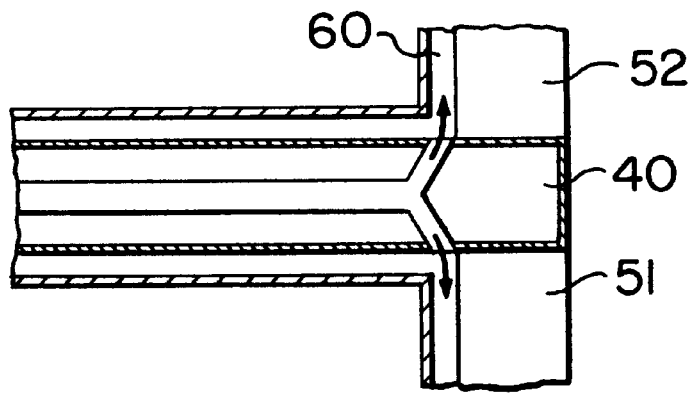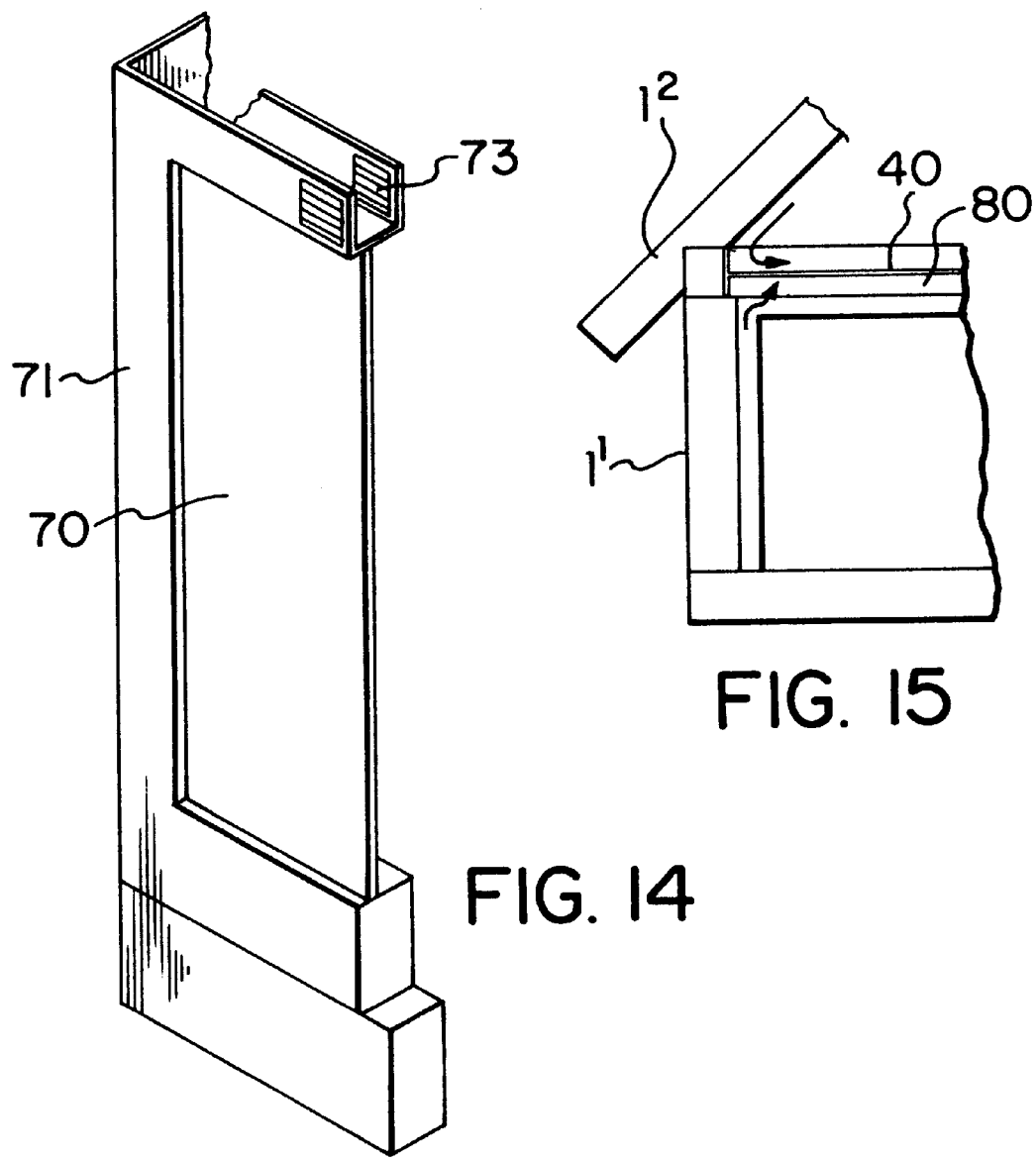

MODULAR BUILDING SYSTEM

This application is filed under 35 U.S.C. 371 of international application No. PCT/CA97/00285 filed Apr. 28, 1997.

FIELD OF THE INVENTION

This invention relates to a modular building system, and in particular to an integrated construction panel suitable, for example, for constructing domestic dwellings from pre-fabricated components, a building constructed from such panels, and a method of constructing a pre-fabricated building.

BACKGROUND OF THE INVENTION

Prefabricated buildings have been known for many years and come in various shapes and sizes. Typically, a frame structure is assembled first. Wooden or metal panels are then applied to the frame structure to form the shell of basic building, which must then be finished in a conventional manner.

Such buildings still require a long time to complete because of all the exterior and interior finishing work that is required. Also skilled craftsmen, who may not be readily available on site, are required to complete the assembly of the building.

An object of the invention is to alleviate the disadvantages of the prior art.

SUMMARY OF THE INVENTION

According to the present invention there is provided an integrated construction panel for use in the construction of modular buildings, especially with integrated services, comprising a grid of structural studs made of fire-proof material bonded together by an adhesive with a high degree of elasticity, a rigid frame surrounding said grid and attached to the end of the studs, said frame being adapted to mate with an adjacent similar panel, front and rear wall members attached to said frame to define a substantially enclosed space therewithin; and a closed cell foam substantially filling said space to provide additional adhesion and distribute external loads throughout the panel.

The panel can be used in buildings with integrated services.

The studs, frame and wall members are preferably made of sheet metal and held together by a modified form of bitumen acting as an adhesive. This modified bitumen can also encapsulate the entire panel to prevent the ingress of moisture and egress of gas from the foam and provide an air seal.

The studs can conveniently be channel-shaped for strength.

A decorative facing, for example of facing bricks, can be applied to the front of the panel using the modified bitumen as an adhesive.

The panels can be assembled at a factory and the transported to a building site for immediate assembly into a self-supporting structure. Unlike conventional prefabricated structures, there is no need first to assemble a frame. The panels themselves provide the necessary structural integrity. Once the panels have been assembled, the building is essentially complete. It only remains to finish the interior.

Some of the panels can be provided with roofing tiles. These roofing panels can be laid directly onto the upper edges of the wall panels using suitable angle brackets, preferably made of sheet metal.

In another aspect the invention provides a method of constructing a pre-fabricated building comprising the steps of providing at an assembly site a plurality of integrated building panels, each panel comprising a grid of structural studs made of fire-proof material bonded together by an adhesive with a high degree of elasticity, a rigid frame surrounding said grid and attached to the end of the studs, said frame being adapted to mate with an adjacent similar panel, front and rear wall members attached to said frame to define a substantially enclosed space therewithin, and a closed cell foam substantially filling said space to provide additional adhesion and distribute external loads throughout the panel; transporting said panels to a building site; and assembling said integrated panels into a building at said building site by joining them together in a self-supporting structure without a separate frame.

DESCRIPTION OF DRAWINGS

The invention will now be described in more detail, by way of example only, with reference to the accompanying drawings, in which:

FIG. 1. is a perspective partly cut-way view of an integrated panel in accordance with the invention;

FIG. 2 is a front elevation of part of the panel shown in FIG. 1;

FIG. 3 is a perspective view of an end panel/floor/roof connector;

FIG. 4 is a perspective view of a bracket for joining a wall section to an overlying wall section.

FIG. 5 a perspective view of a bracket for joining a wall section to a roof section;

FIG. 6 is an perspective view of a sill plate;

FIG. 9 shows a roof join;

FIG. 10 shows a detail of FIG. 9;

FIG. 11 is a perspective view of a corner;

FIG. 13 is a diagrammatic view of a wall-to-wall join showing the heating and ventilating system;

FIG. 14 is a perspective view of a window opening; and

FIG. 15 is a detail of a roof joint.

DETAILED DESCRIPTION OF THE INVENTION

Figure 7:
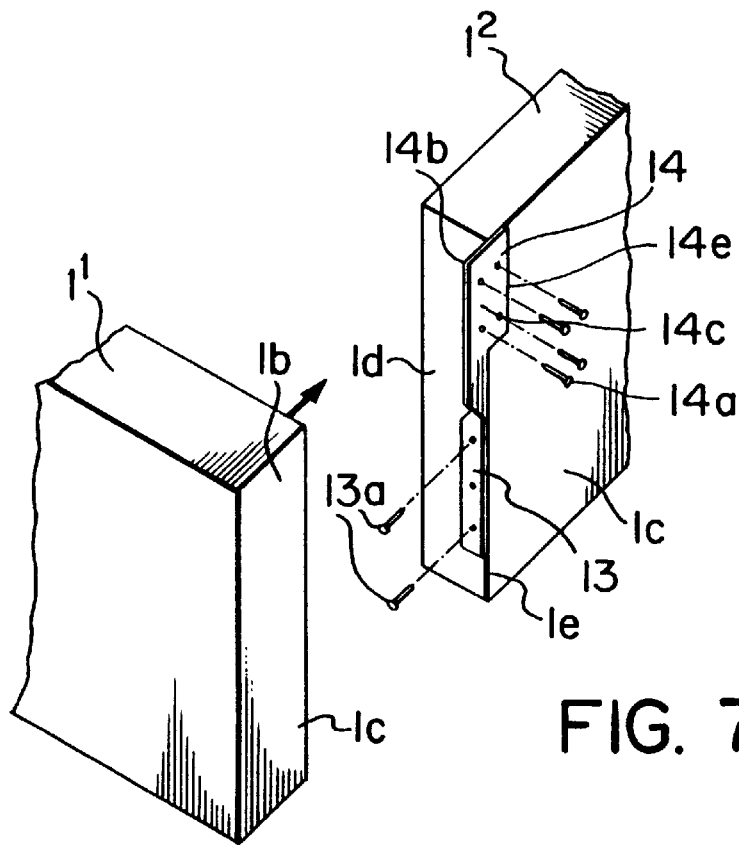
FIG. 7 illustrates the procedure for joining two panels at right angles to make corners.

Referring to FIG. 1, the integrated panel 1 comprises a rectangular outer frame 2 made of shallow C-shaped sheet metal channel members 3 having inturned lips 4 that define the C shape. The channel members 3 are riveted or screwed together with self-tapping screws 3a to form the outer frame 2.

Within the outer frame 2 and extending completely thereacross is a "tartan grid" formed of channel-shaped horizontal studs 5 and vertical studs 6, made of pressed sheet metal. The studs 5 and 6 lie in different planes and contact each other at cross-over points 7a where they are glued together with a modified bitumen glue. A suitable modified bitumen is, for example, Penkote™ bitumen. The modified bitumen provides the necessary strength and also provides insulation between the metal studs to prevent the transfer of heat through conduction while also providing a high degree of elasticity.

A fiber-reinforced rear wall 8, for example of Louisiana board by Canadian Gypsum, is applied to the rear of the panel and screwed onto the lips 4 of the outer frame 2 and rear faces of studs 6 with self-tapping screws 8a. It is additionally glued with the modified bitumen. Vertical trapezoidal-shaped studs 9 are then applied to the outside face of the rear wall 8 for added strength. The studs 9 also serve as supports for retaining conventional drywall applied to the inside of the wall in a completed building. The drywall (not shown) can be screwed onto the studs 9 in a conventional manner.

A similar fiberboard wall 8b is applied to the front of the panel 1.

The entire panel 1 is injected with a closed-cell foam. This can suitably be a two-part polyurethane low or high pressure rigid foam sold under the trade designation PUR by ICI. This foam provides insulation and since it fills the voids within the panel also provides added strength by bonding to all the components of the panel. Alternatively, a fire-proof polyol-based substance can be used in place of the closed cell foam.

The outside of the panel 1 is encapsulated in the same modified bitumen used to glue the studs together to provide an air and vapor seal 1a to the panel 1.

The modified bitumen is also used to glue facing bricks 10 onto the front wall of the panel in the case of wall panels, or in the case of roof panels, roofing tiles.

The panel 1 has structural integrity. By placing adjacent panels into an abutting relationship and joining them together in a manner to be described, it is possible to construct a wall in a very short time. A complete building can be constructed by first joining the panels together to make the walls and them laying the roofing panels onto the upper edges of the walls to form a pitch roof.

The panels are lightweight and thus can be made quite large. Typically, a panel may measure 2.4 meters high 1.2 meters long, so only a few panels are needed to construct the wall of an average house.

The panels are held together with the aid of angle brackets, of which examples are shown in FIGS. 3 to 6. The angle brackets are screwed into the panels using self-tapping screws, which penetrate the metal parts of the panels.

The bracket shown in FIG. 3, used for joining abutting panel sections, is made of sheet metal and comprises a vertical plate 13 and a wide horizontal plate 14. The plates have screw holes 30a to permit them to be screwed to the metal parts of adjacent panels 1 using self-tapping screws.

The bracket shown in FIG. 4, used for joining overlying panel sections, is similar to that shown in FIG. 3 except that it comprises two in-line vertical plates 16 joined by a central horizontal plate 15.

The bracket shown in FIG. 5, used for joining the roof section, comprises a horizontal plate 17, an angle plate 18 with a central rectangular slot 18a and a vertical plate 19.

The sill plate 100 shown in FIG. 6 comprises a horizontal plate 20, a vertical tongue 21 and an angle plate 22 with a rectangular cut-out 22a. A metal tie 22b holds the plate 100 to the concrete foundations.

All the brackets are bent out of a strip of stiff sheet metal with can easily be drilled to receive self-tapping screws that can be screwed into the frame 2 or other metal parts of the panel 1.

In order to construct a building, panels are assembled together in a modular fashion. The panels 1 of the lowermost course are first screwed onto base plates 100 of the type shown in FIG. 6, which are mounted directly onto a concrete floor.

As shown in FIG. 7, in order to join two panels 1 together in a corner configuration, a bracket of the type shown FIG. 3 is employed. The right hand side 14e of plate 14 is screwed by means of self-tapping screws 14a into the outer face 1c of panel $1^2$. The plate 13 is screwed by means of self-tapping screws 13a into the end 1d of the panel $1^2$. This leaves the left half 14b of the plate 14 protruding beyond the end 1d of the panel $1^2$ and this protruding portion is brought into abutting relationship with the free end 1b of the panel $1^1$. This protruding half 14b is then screwed into the end face 1b by means of self-tapping screws 14c. The inside edge 1c of the end face 1b is brought into abutting relationship with the outside edge 1e of the end face 1d of the panel $1^2$ to make a snug abutting fit. This arrangement can also be seen in FIG. 11. The bracket is placed against the inside walls of the panels.

Figure 8:
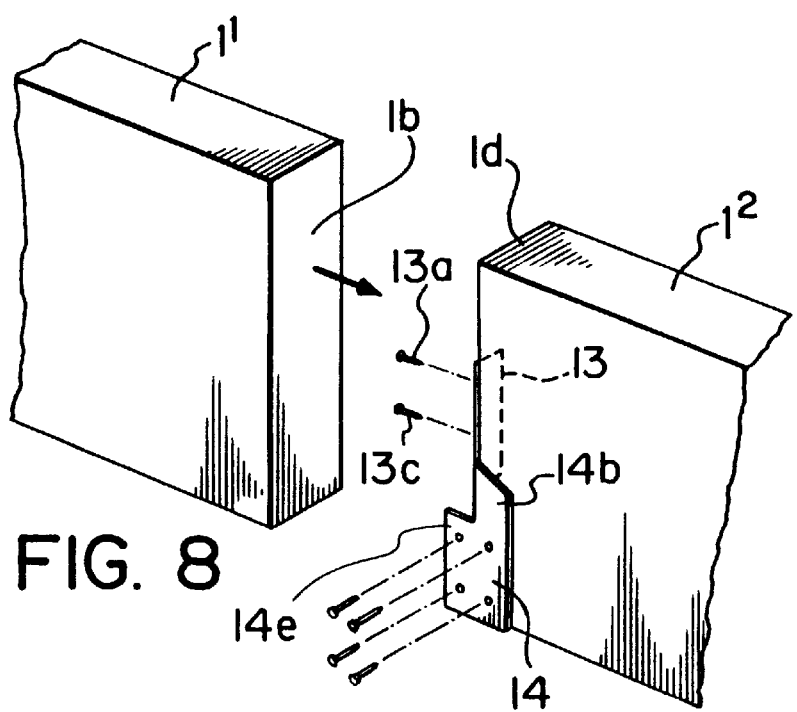
FIG. 8 illustrates the procedure for a butt joint between adjacent panels.

FIG. 8 shows how two panels $1^1$ and $1^2$ can be joined together in an end-to-end abutting relationship. A bracket similar to that shown in FIG. 3 is also used, but oriented in a different manner as shown.

In FIG. 8, the vertical portion 13 is screwed into the end face 1d of the panel $1^2$ by means of self-tapping screws 13a. The half 14b is screwed into the outer face of the panel $1^2$ also by means of self-tapping screws. The end face 1b of the panel $1^1$ is then brought into abutting relationship with the end face 1d of the panel $1^2$. The half 14e of the plate 14 is then screwed into the outer face of the panel $1^1$. The angle brackets are typically about 0.5 meters long and several spaced brackets can be used to join two panels.

FIG. 9 shows a roof panel $1^2$ meeting a panel $1^1$ forming the wall of the second storey of a building. The roof panel $1^1$ is similar to a wall panel except that it is faced with roof tiles 40. The join is made with a bracket 41 of the type shown in FIG. 5. The horizontal plate 17 is screwed onto the upper edge 1e and the tongue 19 is screwed onto the outer face of the panel 1. The plate 18 is screwed onto the underside the panel $1^2$ again -with self-tapping screws. An angular recess 43 is cut out of the panel $1^2$ to allow it to sit snugly on the upper edge 1e of the panel $1^1$ and at the same time have an overhang 44 to form the eaves of the building as shown in FIG. 10.

The panels are arranged in a pitched roof configuration with a 45° angle. The gable ends are complete with panels similar to that shown, but instead of being rectangular in shape being 45° right angle sections.

FIG. 11 shows in more detail the construction of a corner section of a building. A bracket 30 of the type shown in FIG. 3 joins the wall panels at their corners as shown. The bracket 31 attaches to the floor panel 40, which can be of similar construction to the wall panels $1^1$, $1^2$, but of course without the facing bricks, to retain the outside wall panel $1^2$ on the floor panel 40.

Figure 12:
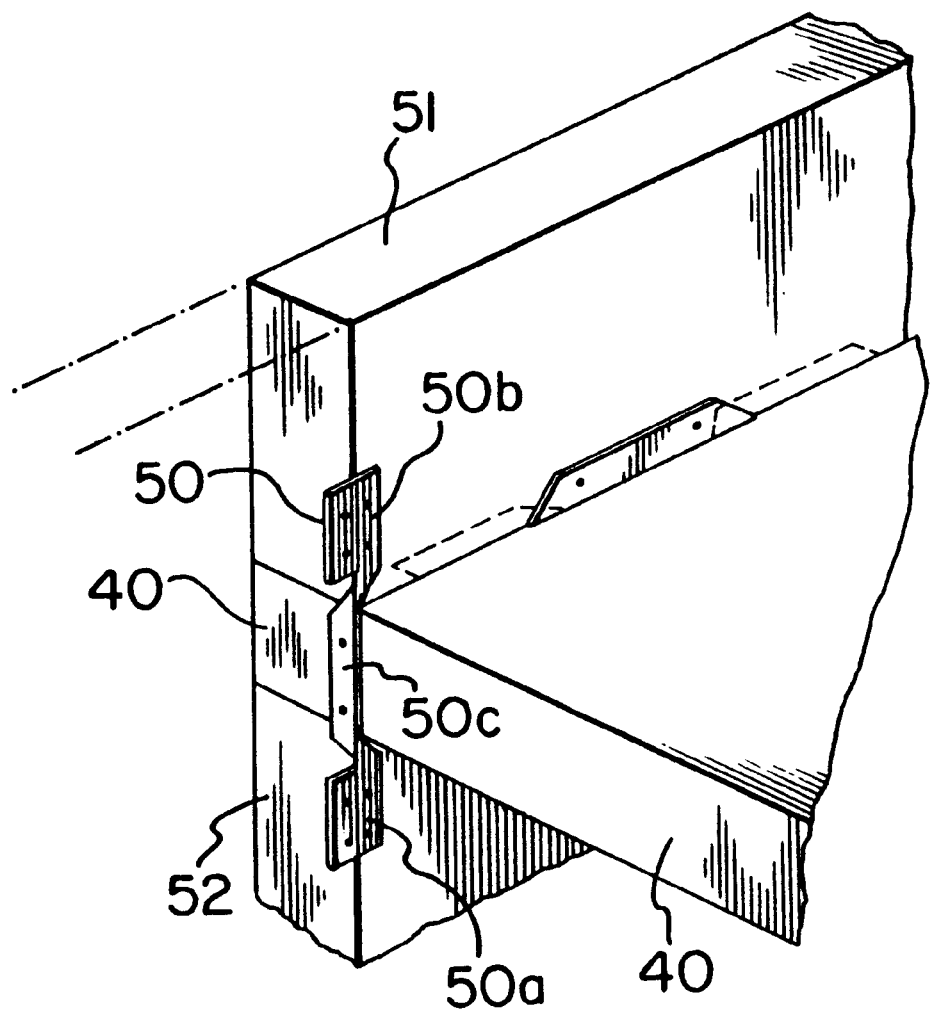
FIG. 12 is a more detailed perspective view showing the wall-to-wall join through a floor.

FIG. 12 illustrates the use of a further kind of tie 50, similar to that shown in FIG. 4 but having wing portions 50a, 50b lying at right angles to the central section 50c and extending on either side of the plane thereof. Such a tie can be used to join upper and lower wall panels 51, 52 and intervening floor panel 40 in the manner illustrated. In this arrangement, the floor panel 40 can also be of similar construction to the panel described with reference to FIG. 1, although of course without the facing bricks. The studs can be provided on both sides for the attachment of floor boards or ceiling panels, if desired.

FIG. 13 illustrates how an air-flow cavity 60 can be easily constructed between the studs 9 and also passed through the floor panels 40 between different storeys of the building.

This allows the ductwork to be pre-configured into the panels prior to construction of the building.

The windows (not shown) can be pre-fabricated within selected window panels.

FIG. 14 shows a ventilation window that can also be incorporated in the panels. Window 70 is surrounded by a frame 71 through which indoor and outdoor air circulates through separate channels. A heat exchanger in lintel 73 allows heat to be exchanged between the inside and the outside air flows. To provide active heating or cooling, the indoor air is passed over a thermoelectric heating element, which acts as a heat pump drawing heat from the outside air.

As shown in FIG. 15, air flows in channels 80 between the metal studs 9 and the inner plasterboard panel (not shown) on all external surfaces, including the roof, wall and ceiling panels.

The described arrangement allows buildings of various shapes and sizes to be erected on site extremely quickly using the pre-fabricated components. A limited number of panels and brackets offers extreme versatility and flexibility in design.

I claim:

1. An integrated construction panel for use in the construction of modular buildings, comprising;
   a grid of rigid structural channel-shaped studs made of pressed sheet metal bonded together by an adhesive with a high degree of elasticity;
   a rigid frame of pressed sheet metal surrounding said grid and attached to the end of the studs, said frame being mateable with an adjacent similar panel;
   front and rear wall members attached to said frame to define a substantially enclosed space therewithin;
   a closed cell rigid foam substantially filling said space so that said structural studs are at least partly embedded therein to provide additional adhesion and distribute external loads throughout the panel; and
   bracket members attached to said rigid frame for joining adjacent panel members into a building structure.

2. An integrated construction panel as claimed in claim 1, wherein said panel is encapsulated in a layer of modified bitumen to provide an air and vapor seal.

3. An integrated construction panel as claimed in claim 1 wherein said studs are glued together at the their cross-over points with modified bitumen.

4. An integrated construction panel as claimed in claim 1, further comprising a decorative facing attached to the front wall member.

5. An integrated construction panel as claimed in claim 4, wherein said decorative facing consists of facing bricks glued onto said front wall member.

6. An integrated construction panel as claimed in claim 4, wherein said decorative facing comprises roof tiles, said panel thereby forming an integrated roof panel.

7. An integrated construction panel as claimed in claim 5, further comprising rigid elongate structural members adhering to the outside of the rear wall member.

8. An integrated construction panel as claimed in claim 7, wherein said rigid structural members comprise trapezoidal-shaped reinforcing members.

9. An integrated construction panel as claimed in claim 7, which is generally rectangular in shape.

10. A prefabricated building constructed from a plurality of abutting integrated panels as claimed in claim 1.

11. A prefabricated building as claimed in claim 10, characterized in that said abutting panels are joined together by said bracket members, which have plate sections adapted to lie flush against respective adjacent panels for attachment thereto.

12. A prefabricated building as claimed in claim 11, wherein said plates are screwed to the adjacent panels with self-tapping screws.

13. A prefabricated building as claimed in claim 12, wherein said self-tapping screws are screwed into said studs.

14. A prefabricated building as claimed in claim 11, wherein said brackets for joining adjacent wall sections have the plate sections thereof lying in orthogonal planes.

15. A method of constructing a pre-fabricated building comprising the steps of providing at an assembly site a plurality of integrated building panels, each panel comprising a grid of rigid structural channel-shaped studs made of pressed sheet metal bonded together by an adhesive with a high degree of elasticity, a rigid frame of pressed sheet metal surrounding said grid and attached to the end of the studs, said frame being mateable with an adjacent similar panel, front and rear wall members attached to said frame to define a substantially enclosed space therewithin, and a closed cell rigid foam substantially filling said space so that said structural studs are at least partly embedded therein to provide additional adhesion and distribute external loads throughout the panel; transporting said panels to a building site; and assembling said integrated panels into a building at said building site by joining then together in a self-supporting structure without a separate frame using bracket members attached to said rigid frame.

16. A method as claimed in claim 15, wherein wall panels are first assembled to form the basic shell of the building and then roof panels of similar construction are laid in a pitch roof configuration onto the upper edges of the roof panels to complete the building.

17. A method as claimed in claim 16, wherein the gable ends are closed with panels of triangular shape.

18. A method as claimed in claim 17, wherein said panels are joined together by said bracket members, which have plates adapted to lie flush against adjacent panels.

* * * * *